(12) United States Patent
Huang et al.

(10) Patent No.: US 7,218,687 B2
(45) Date of Patent: May 15, 2007

(54) RECEIVER WITH BASELINE WANDER CORRECTION AND CORRECTION METHOD THEREOF

(75) Inventors: Chin-Wen Huang, HsinChu (TW); Chao-Cheng Lee, HsinChu (TW)

(73) Assignee: Realtek Semiconductor Corp., HsinChu (TW)

(*) Notice: Subject to any disclaimer, the term of this patent is extended or adjusted under 35 U.S.C. 154(b) by 807 days.

(21) Appl. No.: 10/102,173

(22) Filed: Mar. 20, 2002

(65) Prior Publication Data
US 2002/0181601 A1  Dec. 5, 2002

(30) Foreign Application Priority Data
Mar. 21, 2001 (TW) .............. 90106688 A

(51) Int. Cl.
*H04L 25/06* (2006.01)
*H03L 5/00* (2006.01)
(52) U.S. Cl. .............. 375/317; 375/319; 327/307; 327/317
(58) Field of Classification Search .............. 375/258, 375/317, 319, 287; 327/317, 307, 321, 323; 330/9
See application file for complete search history.

(56) References Cited

U.S. PATENT DOCUMENTS

| | | | | |
|---|---|---|---|---|
| 5,465,272 A | * | 11/1995 | Smith | 375/295 |
| 5,844,439 A | * | 12/1998 | Zortea | 327/307 |
| 6,140,857 A | * | 10/2000 | Bazes | 327/307 |
| 6,301,309 B1 | * | 10/2001 | Hee et al. | 375/286 |

* cited by examiner

*Primary Examiner*—Khanh Tran
*Assistant Examiner*—Sam K. Ahn
(74) *Attorney, Agent, or Firm*—Winston Hsu

(57) ABSTRACT

A receiver with baseline wander correction for correcting a received input signal. The receiver includes first and second biasing resistor networks configured to receive first and a second signal of the received input signal, and to produce a first correction signal and a second correction signal. A comparator is employed to compare the first and the second correction signals in order to produce a control signal. The receiver also has comparison logic and compensation control circuitry. The comparison logic generates a logic signal according to the first and the second correction signals. Finally, the compensation control circuitry produces a compensation signal and provides it to respective output terminals of the first and the second biasing resistor networks so as to correct respective DC values of the first and the second correction signals.

15 Claims, 8 Drawing Sheets

RECEIVER WITH BASELINE WANDER CORRECTION AND CORRECTION METHOD THEREOF

This application claims priority from Taiwanese application no. 90106688, filed in Taiwan, R.O.C., on Mar. 21, 2001, pursuant to 35 U.S.C. 119(a)–(d).

FIELD OF THE INVENTION

The present invention relates generally to the field of data transmission and, in particular, to an apparatus and method for minimizing baseline wander in received signals.

BACKGROUND OF THE INVENTION

In 100 Megabit per second (Mbps) Fast Ethernet applications, a 100 Mbps transmitter transmits a multi-level transmission-3 (MLT-3) signal through a coupling transformer to a transmission medium, and then a 100 Mbps receiver receives the MLT-3 signal over the transmission medium. The transformer is equivalent to a high-pass filter which blocks a DC component of the MLT-3 signal. Unlike the Manchester data encoding scheme used in 10 Mbps Ethernet systems, the MLT-3 signal is not DC balanced and its DC component varies with the signal pattern. When the DC component is filtered, it cannot be compensated sufficiently by simply adding a common mode voltage with a fixed DC level in the receiver end. Thus, an undesirable phenomenon known as baseline wander occurs. If baseline wander is not cancelled out or compensated for, the phenomenon can cause signal distortion in the front end of the receiver. In the worst case, baseline wander can cause the back end of the receiver to produce incorrect results.

FIG. 1 shows a data transmitter baseline wander correction circuit according to the prior art. It uses a feedback circuit taking a feedback signal $E_{feedback}$ from one of the windings of a coupling transformer to generate an estimated DC value. Then, the estimated DC value is added to a digital signal to be transmitted. Thereby, the baseline wander problem in the output transmit signal is corrected. However, a drawback of the data transmitter of FIG. 1 is that it is possible for the feedback network to become unstable. Moreover, if the coupling transformer is not matched well, the output transmit signal and the feedback signal will not be the same. Even though there is no baseline wander in the output transmit signal, it cannot ensure that the receive transformer coupled to the transmission medium does not introduce the undesirable phenomenon at receiver end.

Another technique for correcting baseline wander is illustrated in FIG. 2. By utilizing a peak detector to detect possible directions of baseline wander, the DC value of the received signal is thus adjusted to compensate for baseline wander. A disadvantage of the technique of FIG. 2 is that the output of the peak detector can be affected by data patterns. This may cause ripples in the detected output so that the system of FIG. 2 cannot achieve perfect baseline wander correction. Also, the received signal passes through an equalizer prior to correcting baseline wander. Hence, the linearity required for input terminals of the equalizer should be very strict.

Accordingly, what is needed is a novel technique for correcting baseline wander that utilizes characteristics of baseline wander to compensate for the undesirable phenomenon of a received signal before the signal passes through an equalizer. It would be highly preferable for such a technique to be immune to the effects of the received signal peaks.

Further, it would be desirable to have a receiver with baseline wander correction that decreases its production costs.

SUMMARY OF THE INVENTION

It is an object of the present invention to provide an apparatus and method that corrects the baseline wander inherent in communication systems having transformer coupled transmission medium.

The present invention discloses a receiver with baseline wander correction for correcting a received input signal taken from a coupling transformer. In accordance with one aspect of the invention, the receiver with baseline wander correction includes a first and a second biasing resistor networks configured to receive a first and a second signal of the received input signal, and to produce a first correction signal and a second correction signal. A comparator is provided to receive the first and the second correction signals. The comparator compares the first correction signal with the second correction signal in order to produce a control signal. The receiver also includes comparison logic and compensation control circuitry. The comparison logic receives the first and the second correction signals and then generates a logic signal in accordance with the first and the second correction signals. The compensation control circuitry receives the control signal and the logic signal and produces a compensation signal in accordance with the control and the logic signals. Thereafter, the compensation signal is provided to respective output terminals of the first and the second biasing resistor networks to correct respective DC values of the first and the second correction signals. Further, the receiver has an equalizer coupled to the output terminals of the first and the second biasing resistor networks. The equalizer is configured to receive and compensate the first and the second correction signals.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE PREFERRED EMBODIMENT

Figure 5A:
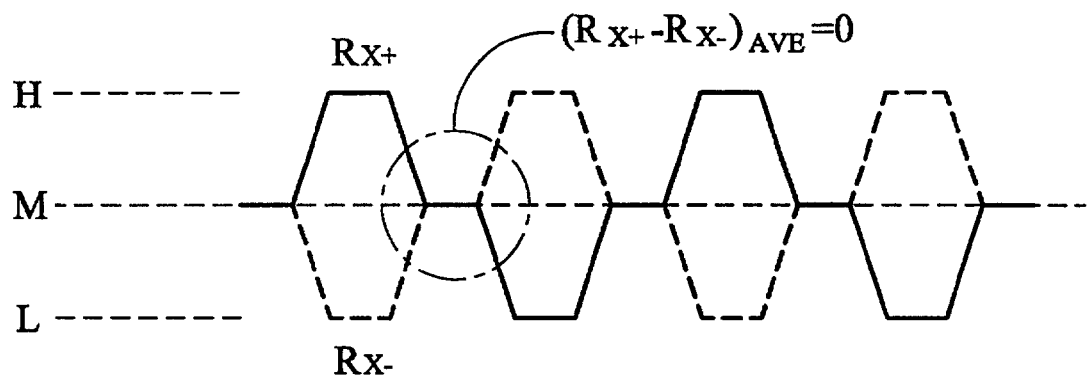
FIGS. 5A~5C are diagrams illustrating baseline wander for an MLT-3 signal.
Figure 5B:
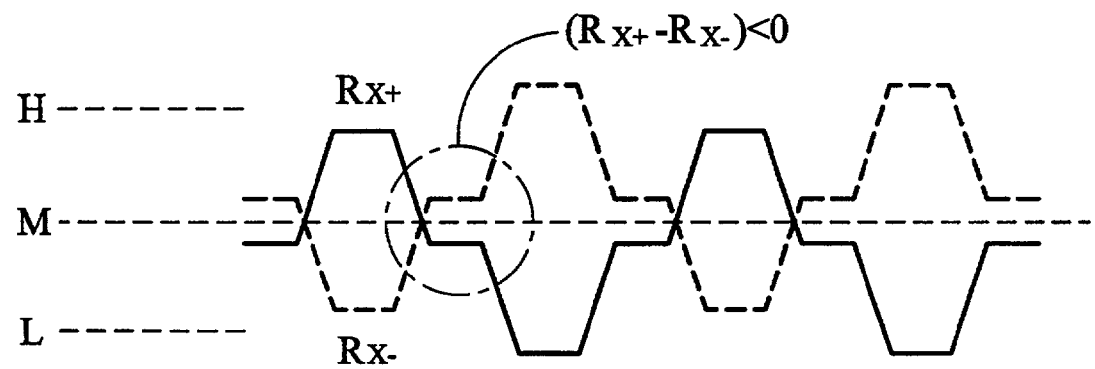
Figure 5C:
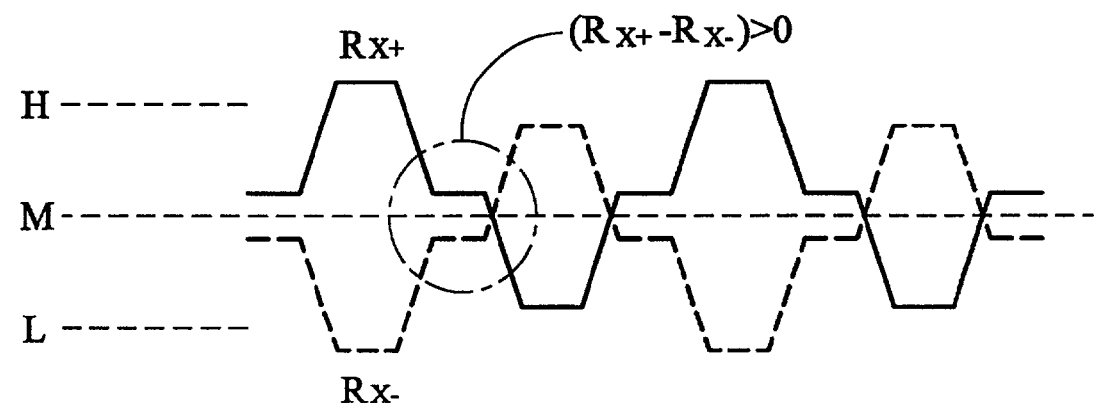

FIGS. 5A~5C illustrate a pair of MLT-3 signals $R_{X+}$, $R_{X-}$ received from two input terminals of a receiver. The MLT-3 encoding scheme for use in Fast Ethernet is a three-level (H, M, L) differential pulse code that makes a transition whenever a "1" exists in the unencoded input data. As shown in FIG. 5A, there is no baseline wander in the received signals $R_{X+}$ and $R_{X-}$. In FIG. 5B, the signal $R_{X+}$ wanders down and the signal $R_{X-}$ wanders up. In contrast, the signal $R_{X+}$ wanders up and the signal $R_{X-}$ wanders down in FIG. 5C. In the illustrations in FIGS. 5B and 5C, an important characteristic of baseline wander is that the pair of received signals $R_{X+}$ and $R_{X-}$ have opposite wander directions. That is, the signal $R_{X+}$ wanders up if the signal $R_{X-}$ wanders down, and vice versa. In general, since a 350 μH coupling transformer has a time constant of approximately 7 μsec, the above-described baseline wander varies slowly. Therefore, the present invention provides a Non-Return-to-Zero Inverted (NRZI) signal RD in accordance with the characteristic of baseline wander to determine when respective DC values of the received signals $R_{X+}$ and $R_{X-}$ are adjusted to compensate for baseline wander.

Still referring to FIG. 5A, the average value of $(R_{X+}-R_{X-})$ is about equal to zero when both received signals $R_{X+}$ and $R_{X-}$ are at the M level. In FIG. 5B, the value of $(R_{X+}-R_{X-})$ is less than zero when the received signals $R_{X+}$ and $R_{X-}$ are at the M level. This is called the type I baseline wander. FIG. 5C shows the type II baseline wander in which the value of $(R_{X+}-R_{X-})$ is greater than zero when the received signals $R_{X+}$ and $R_{X-}$ are at the M level. The received signals $R_{X+}$ and $R_{-}$ are dynamically corrected by adding an opposite direction of DC current, depending on the value of $(R_{X+}-R_{X-})$ which is positive or negative. Further, when the NRZI signal RD is "0", it represents that both received signals $R_{X+}$ and $R_{X-}$ are at the M level (hereinafter referred to as M-level period for brevity).

Figure 1:
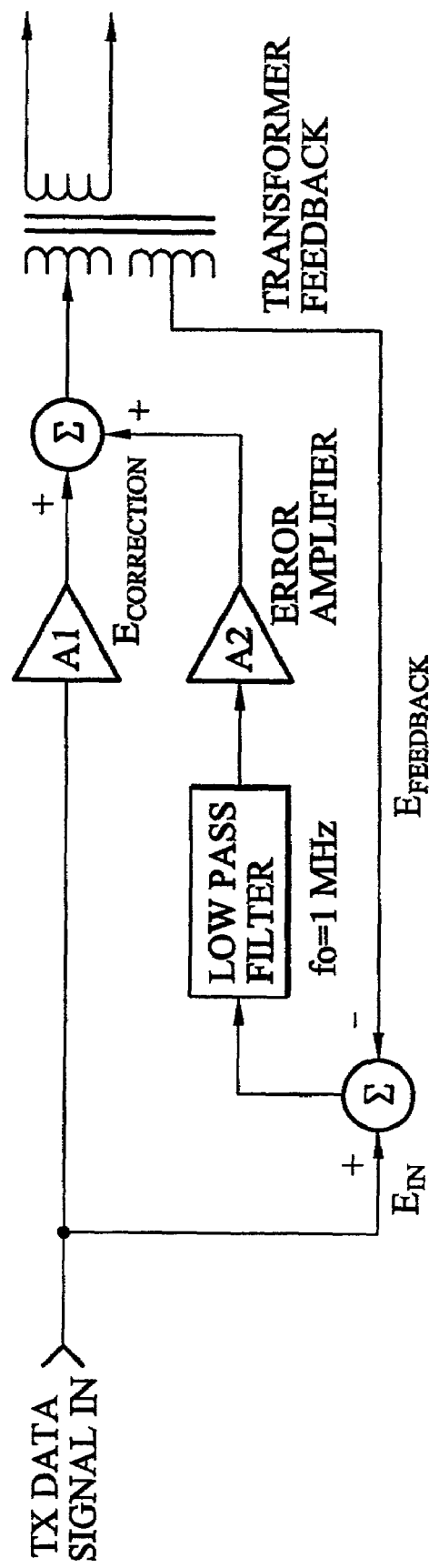
FIG. 1 is a block diagram of a baseline wander correction circuit according to the prior art.
Figure 2:
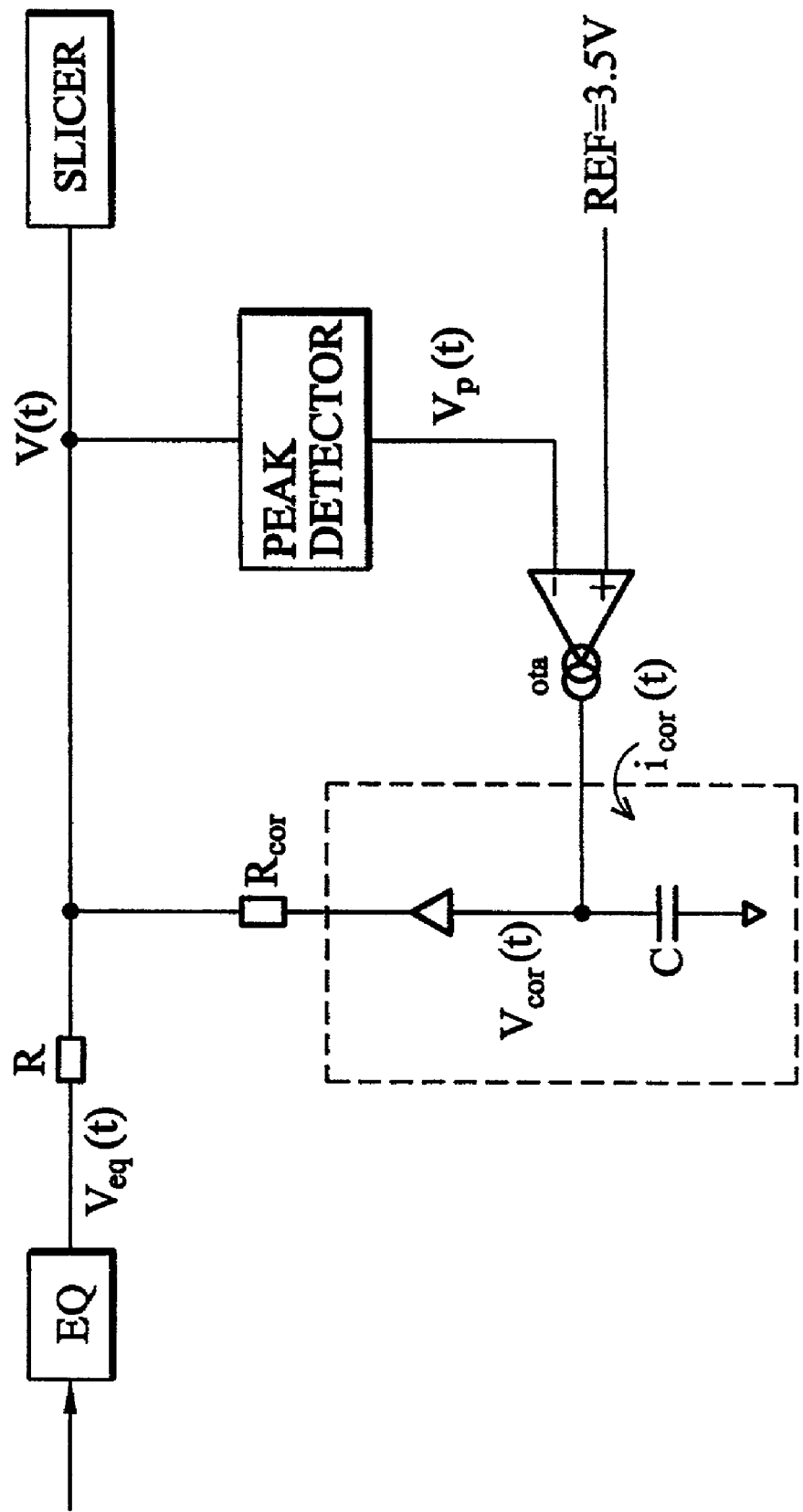
FIG. 2 is a block diagram of a DC restoration circuit according to another prior art.
Figure 3:
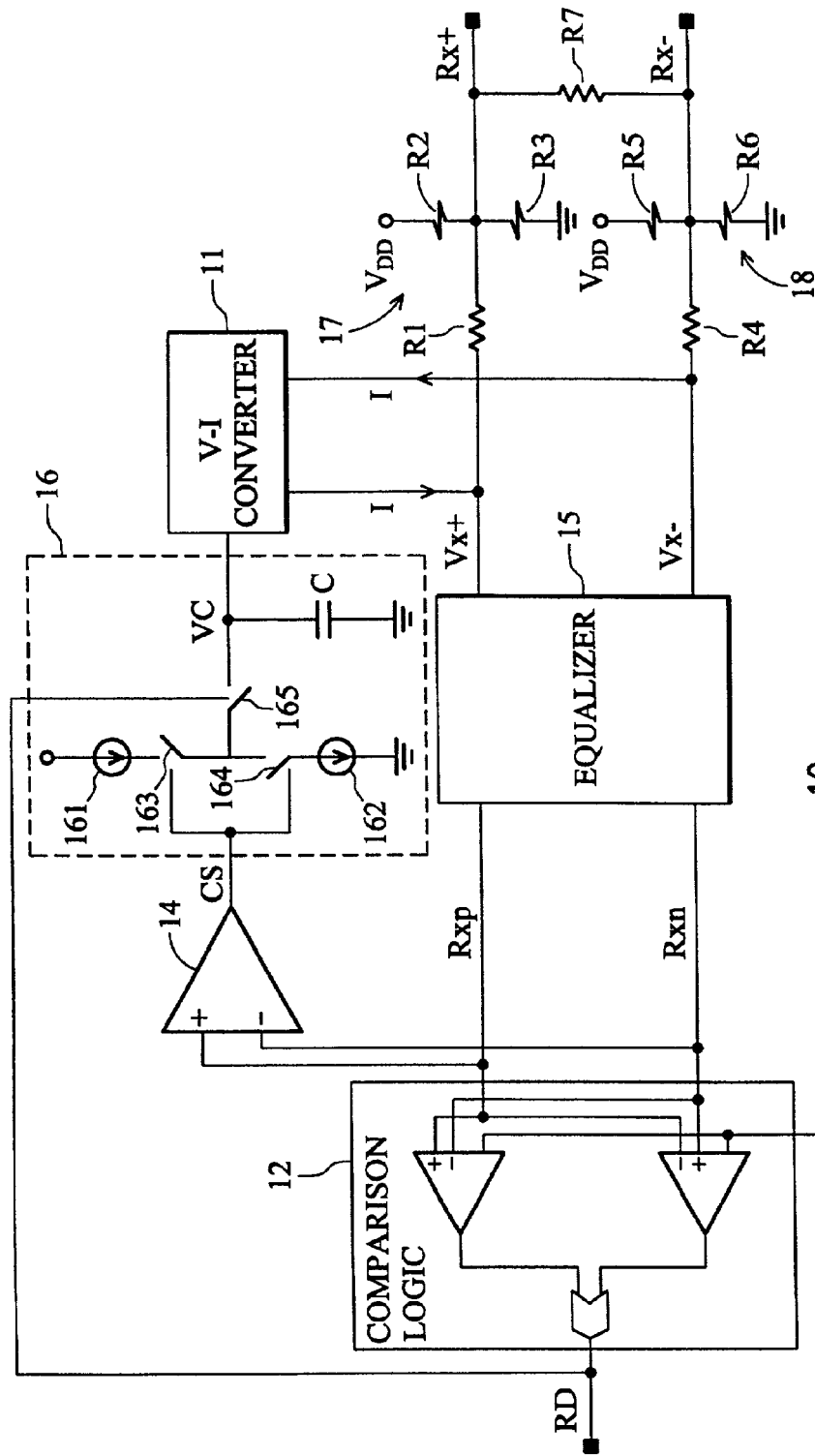
FIG. 3 is a block diagram of a receiver with baseline wander correction according to the present invention.

Referring to FIG. 3, a receiver 10 of the invention receives input signals $R_{X+}$ and $R_{X-}$ from a coupling transformer (not shown). The received signals $R_{X+}$ and $R_{X-}$ are provided to an equalizer 15 which corrects Inter-Symbol Interference (ISI) induced by the transmission medium. The outputs of the equalizer 15, indicated by $R_{XP}$ and $R_{XN}$, pass through comparison logic 12 to produce the NRZI signal RD. The receiver 10 also includes a first biasing resistor network 17, a second biasing resistor network 18, a comparator 14, an integrator 16 and a voltage-to-current (V-I) converter 11. As described above, the NRZI signal RD is used to identify the M-level period in order to determine when the received signals $R_{X+}$ and $R_{X-}$ are adjusted to compensate for baseline wander. Each element of the invention will be described in detail below.

The comparison logic 12 compares the signals $R_{XP}$ and $R_{XN}$ against a threshold level $V_{th}$, respectively. As an example, given a 1 volt peak-to-peak MLT-3 input signal, the threshold level $V_{th}$ is set at 500 mV. The comparison results are logically ORed together to produce the NRZI signal RD. On the other hand, the comparator 14 receives the signals $R_{XP}$ and $R_{XN}$ from the equalizer 15 and compares them to produce a control signal CS. For example, the control signal CS is "1" if the signal $R_{XP}$ is greater than or equal to the signal $R_{XN}$; the control signal CS is "0" if the signal $R_{XP}$ is less than the signal $R_{XN}$. When the NRZI signal RD is logic "0", the integrator 16 charges or discharges a capacitor according to the control signal CS, thereby altering an output voltage VC of the integrator 16. Thereafter, the V-I converter 11 converts the output voltage VC of the integrator 16 into a compensation current I. The compensation current I is applied to the first and the second biasing resistor networks 17, 18 so as to compensate for respective DC values of a first and a second correction signals $V_{X+}$ and $V_{X-}$.

As shown in FIG. 3, the integrator 16 includes a first current source 161, a second current source 162, a first switch 163, a second switch 164, a third switch 165 and a capacitor C. The first current source 161 provides the capacitor C with a charge current through the first and the third switches 163, 165. On the other hand, the second current source 162 provides the capacitor C with a discharge current through the second and the third switches 164, 165. In one embodiment, the first current source's current value is equal to the second current source's current value. Whether the first switch 163 and the second switch 164 are turned on or not, depending on the control signal CS from the comparator 14. The relationships between the control signal CS and the conduction of the switches 163, 164 are listed in Table 1 below.

TABLE 1

|  | Control signal CS = 1 | Control signal CS = 0 |
|---|---|---|
| First switch (163) | OFF | ON |
| Second switch (164) | ON | OFF |

The difference between the signals $R_{XP}$ and $R_{XN}$, i.e., the output of the comparator 14, reflects the status of baseline just during the M-level period. Therefore, the third switch 165 is made conductive when the signals $R_{XP}$ and $R_{XN}$ are at the M level. In addition, the NRZI signal is logic "0" if both signals $R_{XP}$ and $R_{XN}$ are at the M level as described above. The third switch 165 is controlled by the NRZI signal RD and made conductive as the NRZI signal RD=0.

Figure 4:
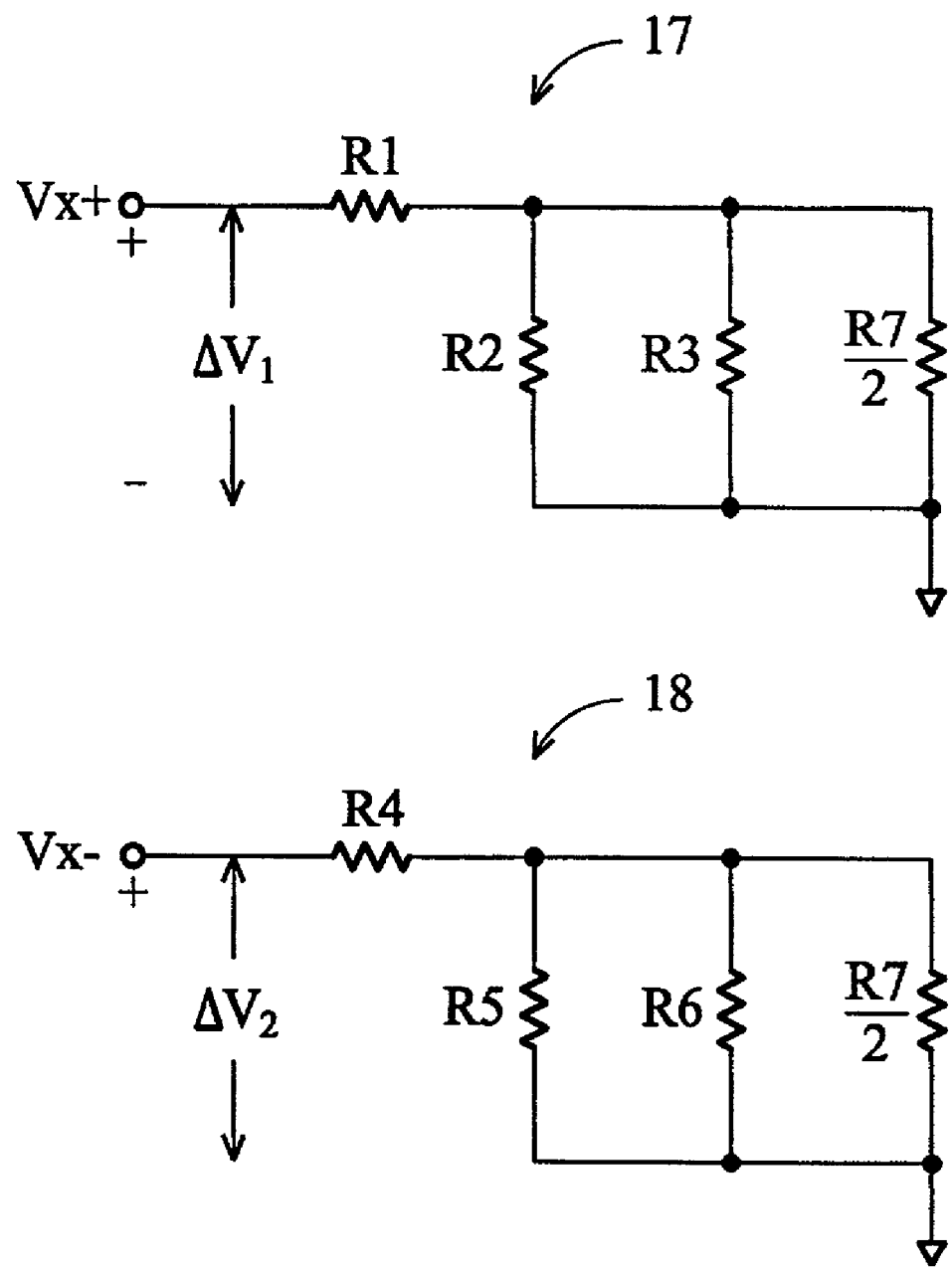
FIG. 4 shows equivalent small-signal models of biasing resistor networks.

FIG. 4 shows equivalent small-signal models of the first and the second biasing resistor networks 17, 18. As depicted, the first biasing resistor network 17 is constructed of resistors R1, R2, R3, and R7/2 and the second biasing resistor network 18 is constructed of resistors R4, R5, R6, and R7/2. Resistor R7 with resistance equal to 100 ohms is a matching resistor. Note that R7/2 stands for an equivalent resistor having half the resistance of R7.

The concept of the invention will now be described herein. The voltage difference ΔV1 for the first biasing resistor network 17 is given by:

$$\Delta V1 = I \times (R1 + RA)$$

while the voltage difference ΔV2 for the second biasing resistor network 18 is $$\Delta V2 = -I \times (R4 + RB)$$

where I is the compensation current, RA is an equivalent resistance of the parallel combination of R2, R3 and R7/2, and RB is an equivalent resistance of the parallel combination of R5, R6 and R7/2. If R1=R4, R2=R5 and R3=R6, then $$|\Delta V1| = |\Delta V2|$$

After some algebra, the respective DC values of signals $V_{X+}$ and $V_{X-}$ in FIG. 4 are $$V_{X+}\big|_{DC} = Vdd \times \frac{R3}{R2+R3} + \Delta V1$$

$$V_{X-}\big|_{DC} = Vdd \times \frac{R6}{R5+R6} + \Delta V2$$

Accordingly, ΔV1 and ΔV2 provided by the biasing resistor networks 17, 18 can be used to correct the DC values of signals $V_{X+}$ and $V_{X-}$. For a type I baseline wander, the signal $R_{XP}$ is less than the signal $R_{XN}$ during the M-level period so that the voltage of the capacitor C should be increased. The control signal CS becomes "0" in order to turn on the first switch 163 and turn off the second switch 164. This enables the capacitor C to be charged when the third switch 165 is turned on. As a result, $\Delta V1$ is increased and $\Delta V2$ is decreased. Conversely, for a type II baseline wander, the signal $R_{XP}$ is greater than the signal $R_{XN}$ during the M-level period so that the voltage of the capacitor C should be decreased. The control signal CS becomes "1" in order to turn off the first switch 163 and turn on the second switch 164. This enables the capacitor C to be discharged when the third switch 165 is turned on. Consequently, $\Delta V1$ is decreased and $\Delta V2$ is increased.

Figure 6:
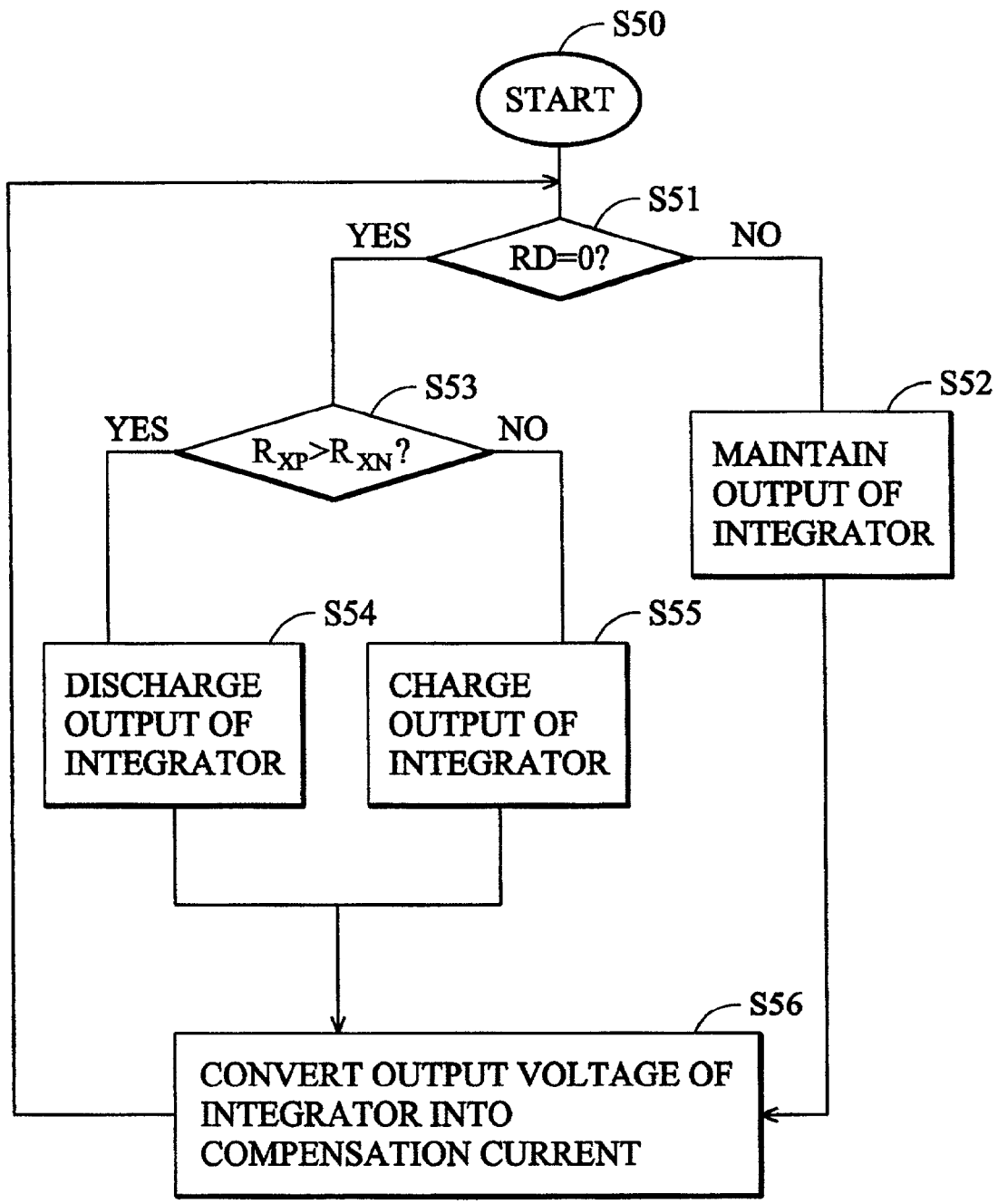
FIG. 6 is a flowchart illustrating the operation of the invention.

Turning now to FIG. 6, an operational flowchart of the invention is illustrated. The comparison logic 12 provides the NRZI signal RD and the integrator 16 checks to determine whether the NRZI signal RD is "0" (step S51). The integrator 16 maintains its output voltage VC if the NRZI signal RD is not "0" (step S52), and then it proceeds to step S56. Otherwise, the comparator 14 compares the signal $R_{XP}$ to the signal $R_{XN}$ (step S53). If the signal $R_{XP}$ is greater than the signal $R_{XN}$, it proceeds to step S54 where the integrator 16 discharges its output voltage VC. If the signal $R_{XP}$ is less than the signal $R_{XN}$, it proceeds to step S55 where the integrator 16 charges its output voltage VC. Finally (step S56), the V-I converter 11 converts the voltage VC into the compensation current I so as to adjust $\Delta V1$ and $\Delta V2$, and thus the signals $R_{XP}$ and $R_{XN}$ are corrected.

Figure 7A:
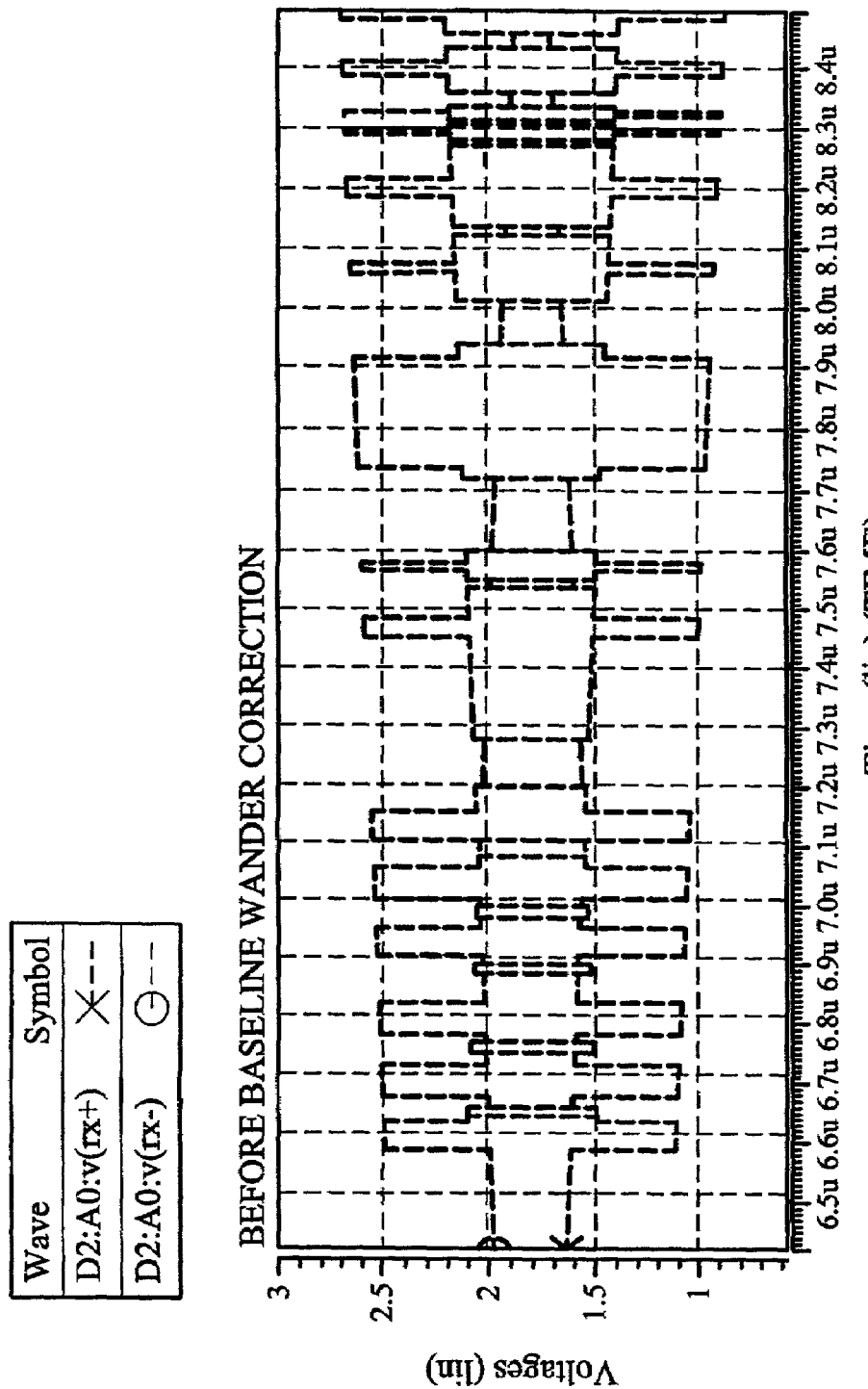
FIGS. 7A~7B are plots showing the simulation result of the invention.
Figure 7B:
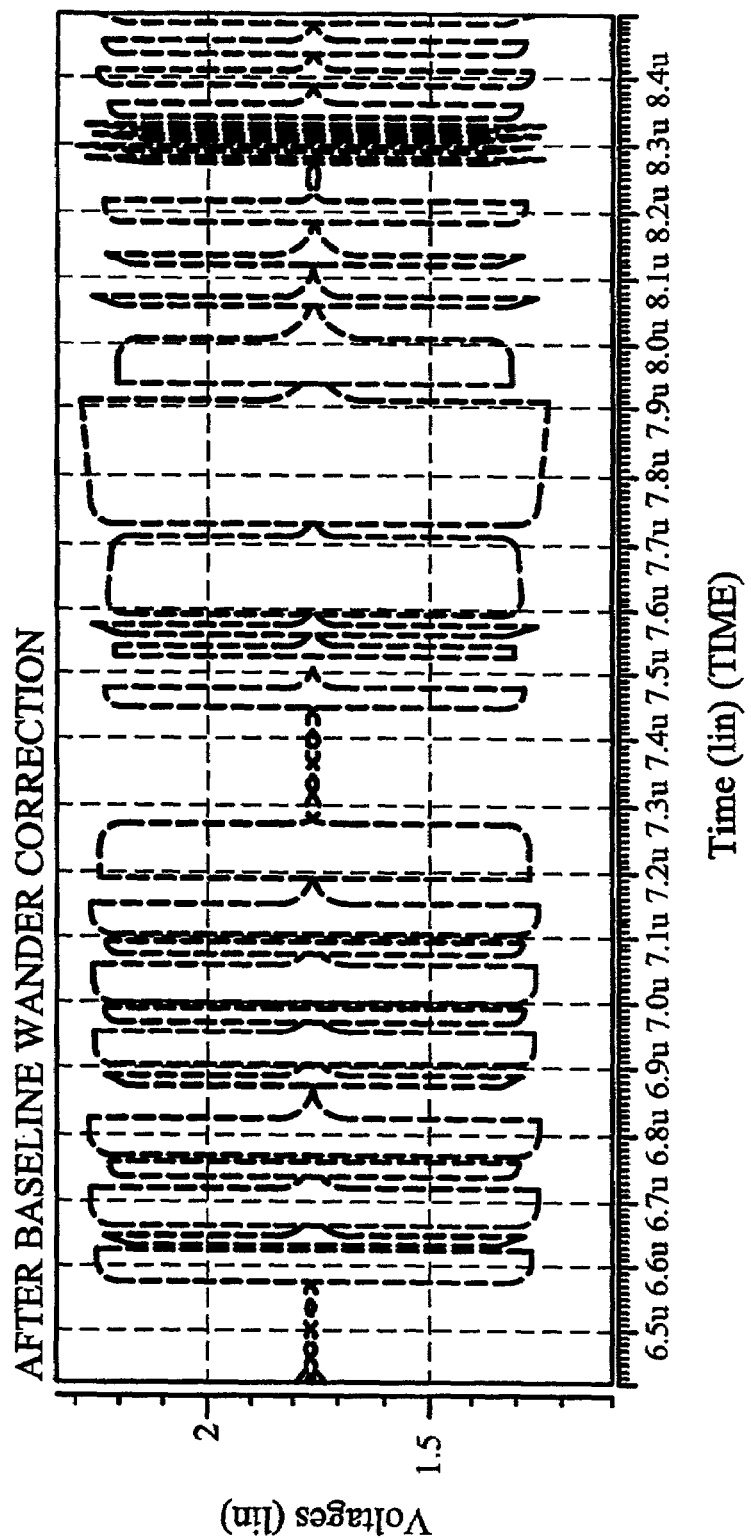

According to the present invention, the compensation current I is controlled by the integrator 16, and the integrator 16 changes its output to the V-I converter 11 only when the NRZI signal is "0". Hence, the received signal peaks should not affect baseline wander correction. Furthermore, the receiver 11 of the invention compensates for the DC values of the signals $V_{X+}$ and $V_{X-}$ before they pass through the equalizer 15. It is not necessary that the equalizer 15 have good linearity. FIG. 7A shows waveforms of MLT-3 input signals with baseline wander. FIG. 7B shows waveforms that are corrected according to the invention.

It is appreciated that the receiver 10 of the invention can use an up/down counter and a digital-to-analog converter (DAC) instead of the integrator 16 and the V-I converter 11. The output of the comparator 14 causes the up/down counter to increment or decrement its count value. Then, the DAC converts the count value into the corresponding current value.

While the invention has been described by way of example and in terms of the preferred embodiment, it is to be understood that the invention is not limited to the disclosed embodiment. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A receiver with baseline wander correction, for correcting a received input signal taken from a coupling transformer to output an output signal of baseline wander correction, comprising:

a first and a second input terminal receiving a first and a second signals of the received input signal, respectively;

a comparator receiving the first and the second signals of the received input signal, and comparing the first and the second signals of the received input signal to produce a control signal;

comparison logic receiving the first and the second signals of the received input signal, and generating the output signal of baseline wander correction in accordance with the first and the second signals of the received input signal; and compensation control circuitry receiving the control signal and the output signal, producing a compensation signal in accordance with the control and the output signals, and providing the compensation signal to the input terminals to correct respective DC values of the first and the second signals of the received input signal, wherein the compensation control circuitry comprises:

an integrator, responsive to the control and the output signals, generating a compensation voltage; and a voltage-to-current converter, producing the compensation signal in accordance with the compensation voltage, and wherein the integrator comprises:

a capacitor for producing the compensation voltage;

a first switch, responsive to the output signal, for allowing the capacitor to be charged and discharged;

a first current source providing the capacitor with the charge current;

a second current source providing the capacitor with the discharge current;

a second switch, responsive to the control signal, made conductive to charge the capacitor through the first switch when the control signal is at a first state; and a third switch, responsive to the control signal, made conductive to discharge the capacitor through the first switch when the control signal is at a second state.

2. The receiver with baseline wander correction of claim 1, further comprising an equalizer, coupled between the input terminals and the comparison logic, and configured to receive and compensate the first and second signals of the received input signal.

3. The receiver with baseline wander correction of claim 1, wherein the first current source's current value is equal to the second current source's current value.

4. The receiver of claim 1, further comprising:

a first and a second biasing resistor network, coupled to the first and the second input terminals, respectively, receiving the first and the second signals of the received input signal, and providing respective DC values of the first and the second signals of the received input signal, respectively.

5. The receiver of claim 1 wherein the output signal comprises low and high levels, and the compensation control circuitry adjusts the compensation signal when the output signal is at the low level.

6. The receiver of claim 5, wherein the output signal is a Non-Return-to-Zero Inverted (NRZI) signal.

7. The receiver of claim 1, wherein the received input signal is an MLT3 Ethernet signal.

8. A baseline wander reduction apparatus, comprising:

first and second input terminals to receive first and second signals of a received input signal, respectively;

a comparator, coupled to the first and the second input terminals, comparing the first and the second signals of the received input signal to produce a control signal;

a comparison logic coupled to the first and the second input terminals, receiving the first and the second signals of the received input signal, and generating an output signal in accordance with the first and the second signals of the received input signal; and compensation circuitry, coupled between the comparator and the first and the second input terminals, receiving the control signal and the output signal, adjusting a baseline wander correction signal in response to the control signal, determining whether the baseline wander correction signal is adjusted in response to the output signal, and providing the baseline wander correction signal to the input terminals to correct respective DC values of the first and the second signals of the received input signal.

9. The apparatus of claim 8, wherein the output signal comprises and low levels, wherein the baseline wander correction signal is adjusted when the output signal is at the low level.

10. The apparatus of claim 8, wherein the compensation circuitry comprises
a first switch, for determining whether the baseline wander correction signal is adjusted in response to the output signal, and
second and third switches for adjusting the baseline wander correction signal in response to the control signal.

11. The apparatus of claim 10, wherein the compensation circuitry further comprises
a first current source, coupled to the second switch, for providing a source current into the second switch, and
a second current source, coupled to the third switch, for providing a sink current from the third switch.

12. The apparatus of claim 8, further comprising an equalizer, coupled between the input terminals and the comparison logic and configured to equalize the first and the second signals of the received input signal.

13. The apparatus of claim 8, further comprising first and second biasing resistor networks, coupled to the first and the second input terminals, respectively, for providing respective DC values of the first and the second signals of the received input signal, respectively.

14. A method for reducing baseline wander in a differential signal carried in first and second lines, the method comprising:
comparing first and second signals of the differential signal to produce a control signal;
generating an output signal in accordance with the first and the second signals of the differential signal;
adjusting a baseline wander correction signal in response to the control signal;
determining whether the baseline wander correction signal is adjusted in response to the output signal; and
correcting respective DC values of the first and the second signals of the differential signal according to the baseline wander correction signal.

15. The method of claim 14, wherein the output signal comprises high and low levels, wherein the baseline wander correction signal is adjusted when the output signal is at the low level.

* * * * *